United States Patent [19]

Rosa et al.

[11] 3,991,354

[45] Nov. 9, 1976

[54] VARIABLE SPEED DRIVE FOR INDUCTION MOTOR

[75] Inventors: John Rosa, Penn Hills Township, Pa.; Alec H. B. Walker, Englewood, Fla.

[73] Assignee: Westinghouse Electric Corporation, Pittsburgh, Pa.

[22] Filed: May 29, 1975

[21] Appl. No.: 581,981

[52] U.S. Cl. .............................. 318/231; 318/227; 321/7
[51] Int. Cl.² .......................................... H02P 7/42
[58] Field of Search ............ 318/197, 227, 230, 231

[56] References Cited
UNITED STATES PATENTS

| | | | |
|---|---|---|---|
| 3,527,995 | 9/1970 | Lee et al. | 318/231 X |
| 3,803,478 | 4/1974 | Honey | 321/7 |

Primary Examiner—Gene Z. Rubinson
Attorney, Agent, or Firm—G. H. Telfer

[57] ABSTRACT

A variable speed drive is provided for a polyphase induction motor. The motor is connected through a contactor to a constant frequency polyphase alternating current power source for starting and for full speed operation but is supplied by a variable frequency source in a single phase operating mode when reduced speed levels are desired. In the single phase operating mode, low speed operation is provided by driving the motor with a cycloconverter which converts power from the polyphase source to single phase alternating current of a predetermined lower frequency. The motor speed decreases from a higher level to a lower level by coasting, with gate signals of the cycloconverter suppressed until a desired lower speed is reached. Initiation of contactor and cycloconverter operation is coordinated by motor speed sensing means.

9 Claims, 6 Drawing Figures

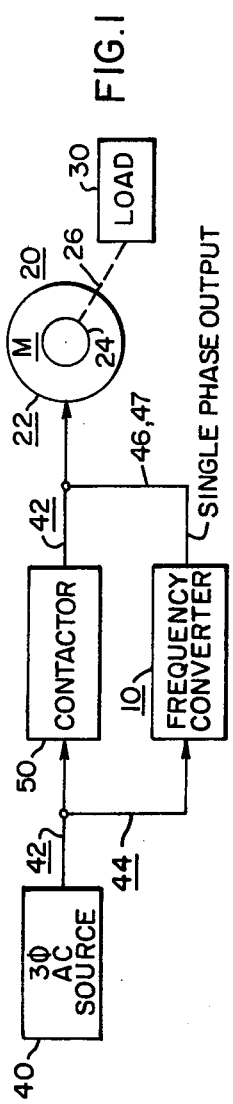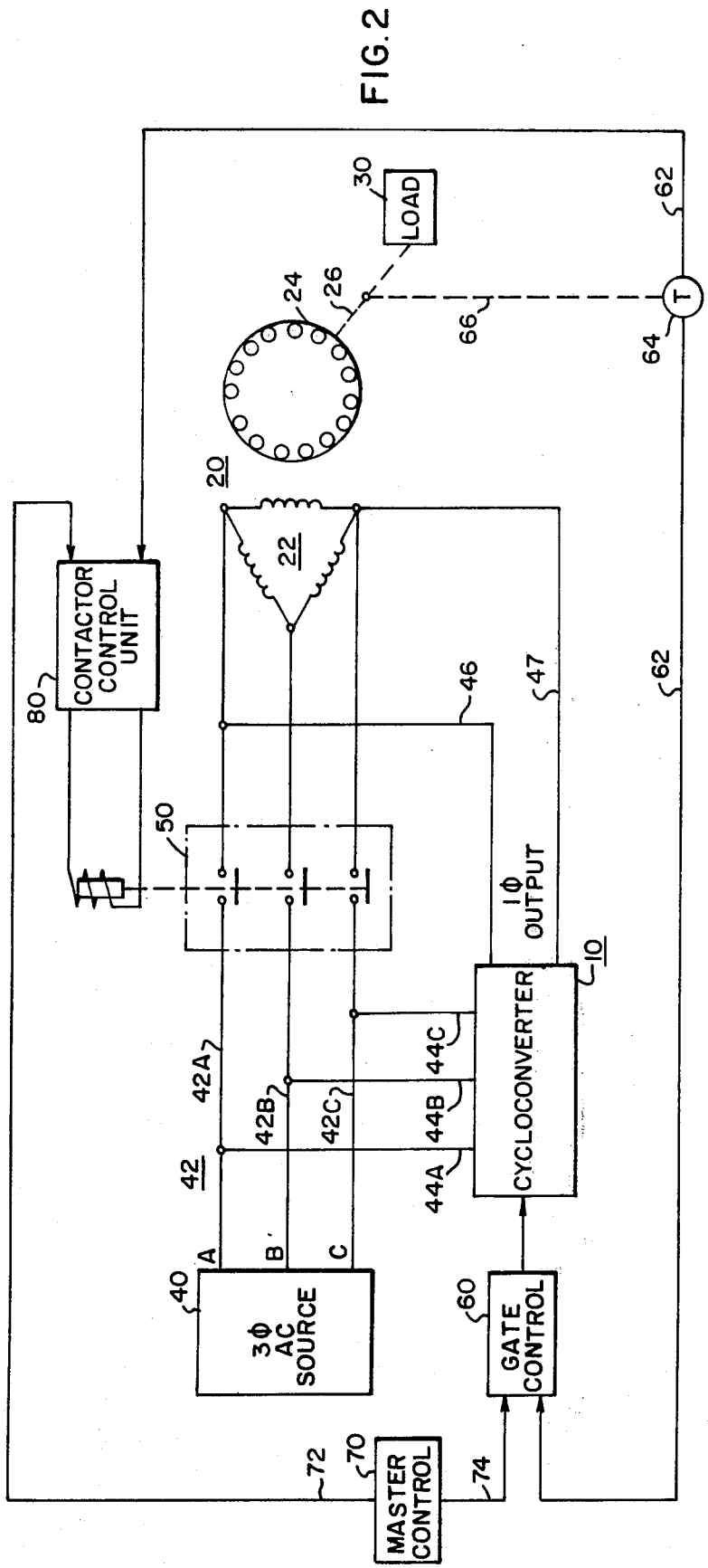

VARIABLE SPEED DRIVE FOR INDUCTION MOTOR

BACKGROUND OF THE INVENTION

1. Field of the Invention

This invention relates generally to motor control systems, and more particularly to a variable speed drive for a polyphase induction motor in which speed control is provided by a thyristor frequency converter which drives the motor at lower speeds in a single phase mode.

2. Description of the Prior Art

Polyphase induction motors of the squirrel cage and wound rotor types are widely used in a variety of industrial applications. While the polyphase induction motor is well adapted for constant speed work, there are many applications where variable speed control is necessary. Of particular interest are variable speed applications involving fan-type loads, i.e., the type of load encountered in transporting a liquid or gas where the load torque varies as the square of the motor speed. Examples of such fan type loads are blower drives for forcing furnace drafts and pump drives for oil and gas pipelines.

Some fan type loads require single speed operation, but others, such as those associated with boiler draft control, may require a speed range of 2:1 or more in order to control the transported volume of air. Conventional electrical methods of speed control have sometimes been used for these applications, but they are relatively expensive and are thus in competition with mechanical speed control devices such as hydraulic couplings or other means of volume control such as damper vanes. Both mechanical speed control arrangements and damper vanes are relatively inexpensive but are inherently inefficient at reduced volumes. Since the drive for fan type loads may be required to operate for extended periods at reduced speeds, the question of efficiency is of interest. It is desirable, therefore, to provide an electrical speed control system for a polyphase motor which is cost competitive with mechanical speed control arrangements and which operates efficiently at reduced speed levels.

A large number of electrical drives have been developed over the years for the purpose of securing a wide range of operating speed from an induction motor. These drives generally involve one of the following methods: changing the frequency of the applied stator voltage; changing the number of poles of both the stator and the rotor; controlling the rotor speed by means of rheostatic rotor control; or mounting the stator in bearings and driving it with an auxiliary motor. These control methods depend upon switching in the power circuits or modulation of the power flow by intermediate power conversion equipment. The cost and complexity of the required auxiliary equipment have limited the application of these electrical drive systems in favor of the simple and relatively inexpensive mechanical control devices. Recently, however, improvements in thyristor switching devices such as the silicon control rectifier (SCR) have made possible static frequency converters which are inexpensive, reliable, and efficient. This has revived interest in the possibility of using electric motor drives for speed control of induction motors in applications which traditionally have been controlled by mechanical means.

SUMMARY OF THE INVENTION

The present invention provides a motor speed control system in which a static frequency converter, such as a thyristor cycloconverter, is utilized to vary the supply frequency to a polyphase induction motor. The motor is operated in a polyphase mode during starting and full speed operation, and in a single phase mode at reduced speed levels. In the polyphase mode, power from a constant frequency polyphase power source is applied directly to the motor through a contactor, and the static frequency converter is gated off. In the single phase mode, the contactor is opened and the motor is allowed to coast to the desired speed. When the desired speed is reached, the frequency converter is gated on and single phase alternating current of a lower frequency is supplied to the motor.

The frequency converter changes constant frequency polyphase alternating source current to single phase alternating current of a preselected lower constant frequency which corresponds with the desired lower operating speed. The cycloconverter generally comprises a plurality of phase controlled rectifiers which are arranged in positive and negative groups. The controlled rectifiers associated with each phase are connected in reverse parallel with respect to the input so as to alternately provide a half cycle of each full cycle of input current. The controlled rectifier groups are connected in reverse parallel with respect to the output so that selected combinations of rectifiers in each group may alternately provide a half cycle of each full cycle of output current. By proper modulation of the firing angles of the rectifiers, the frequency and amplitude of the converter's output are continuously and independently controllable, thus providing variable speed control of the induction motor.

In the interest of economy, fixed firing patterns are used in the present invention to provide preselected, discrete output frequencies. Also, the controlled rectifiers of each group are connected together to provide a single phase output, rather than a polyphase output, which considerably reduces drive circuit complexity.

Although the polyphase stator winding currents of the motor may be unbalanced when it is operating in a single phase mode, rotor heating due to negative sequence currents in not critical since the motor is being operated at substantially reduced power levels (horsepower load decreases in proportion to the cube of motor speed for fan type loads). The polyphase motor is single phased while it is running and will continue to run as a single phase motor provided the load torque does not exceed the breakdown torque of the motor. Again this is not a problem, since for fan type loads torque loading decreases in proportion to the square of motor speed, and the motor will be operated safely at substantially reduced torque levels.

Control means including a contactor control unit, a gate control unit, and speed sensing means control the operation of the frequency converter and the contactor during both modes of operation.

BRIEF DESCRIPTION OF THE DRAWINGS

The invention will be more fully understood from the following detailed description, taken in connection with the accompanying drawing, in which:

FIG. 1 is a block diagram showing a preferred embodiment of the invention;

FIG. 2 is the motor control system of FIG. 1 augmented by a cycloconverter in combination with various control units;

DESCRIPTION OF THE PREFERRED EMBODIMENT

Figure 3:
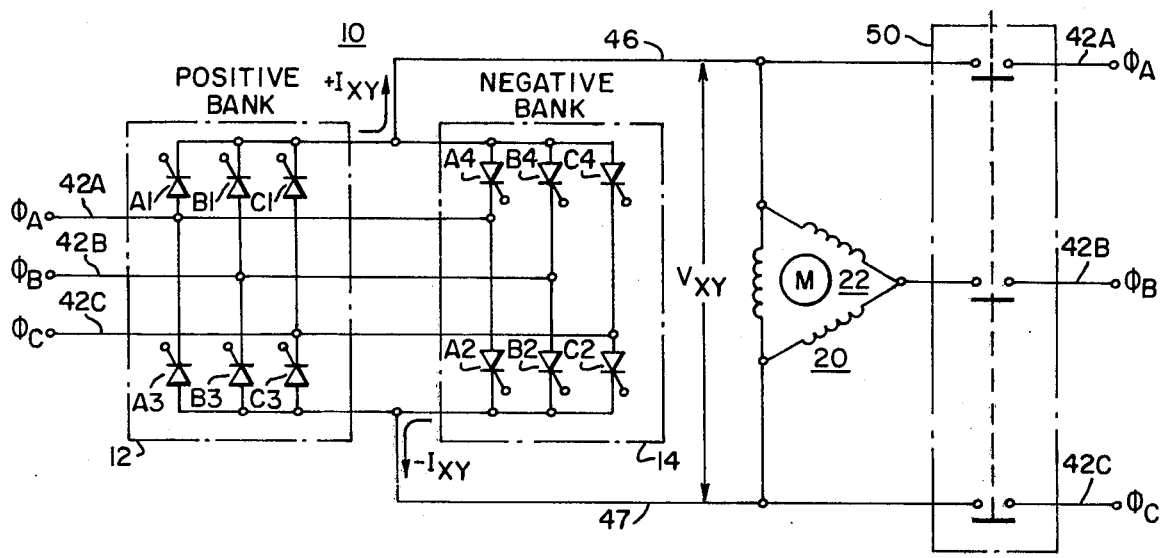
FIG. 3 is a schematic diagram illustrates a preferred arrangement of the cycloconverter of FIG. 2.

Throughout the description which follows, like reference characters refer to like elements on all figures of the drawing.

A preferred embodiment of the invention is shown in FIG. 1 in which a frequency converter 10 is utilized to provide variable speed control of a polyphase induction motor 20. The motor 20 may be a three phase motor of any conventional construction and preferably has a three phase stator winding 32 and a squirrel cage rotor 24. The induction motor 20 serves as a drive motor which, through suitable mechanical coupling means 26, drives a rotary mechanical load 30. While the load 30 may be of any desired mechanical type, the invention is particularly suited for driving a fan type load, such as a pump in a fluid system, in which the torque load decreases in proportion to the square of drive motor speed.

In certain fan type load applications variable speed control is desirable for operation at full rated speed or at selected reduced speed levels. In the present invention, power for starting and for full speed operation is provided by a conventional 60 Hz three phase alternating current source 40 having three balanced output phases which are displaced in time by 120°. Three phase power from the source 40 is coupled by means of a phase conductor group 42 to the stator winding 22 of the motor 20 through a switch such as a power contactor 50 for direct across-the-line starting and three phase full-speed operation. Since during start-up an induction motor usually draws approximately six times its rated current when rated voltage is applied to its stator, the three phase source 40 should be of sufficient capacity to provide the required voltage and current. Of course, the usual techniques may be employed to limit starting in-rush. The contactor 50 may be of any suitable three pole, single throw type having the requisite current rating.

When the induction motor 20 is started with its rated voltage across its stator winding 22, it will develop a starting torque which will cause the speed of the rotor 24 to rise. As its speed increases from stand-still, its slip will decrease and when approaching slip at synchronous speed its torque will decrease until it reaches equilibrium with the applied torque of the load.

The motor 20 is preferably a conventional squirrel cage induction motor in which the rotor winding 24 is short circuited and is supplied by induction from the stator winding 22 which is directly connected to the three phase AC supply 40. This establishes an air gap magnetic field of constant amplitude which rotates at a synchronous speed $$n_1 = 60 f_1/p$$

where $p$ is the number of pole pairs for which the stator is wound and $f_1$ is the stator frequency in Hz. If the motor operates within its rated torque range, the rotor speed, $n$, is within a few percent of synchronous speed $n_1$. The speed of the motor can, therefore, be controlled by variation of the supply frequency, $f_1$.

According to the teachings of the present invention, variable speed control of the induction motor 20 is achieved as described above by supplying it with single phase, variable frequency alternating current from the frequency converter 10. At full speed and full load power, the three phase input winding 22 of the motor 20 is connected directly to the three phase source 40 through the contactor 50 without using the frequency converter 10. For reduced speeds, the contactor 50 is opened and a single phase alternating current of a predetermined lower frequency is supplied by the frequency converter 10 to a single input phase of the stator winding 22 by means of a single phase conductor pair 46, 47. The frequency converter 10 may derive its input power from any convenient constant frequency source including the three phase AC source 40, from which three phase alternating current is coupled by means of a phase conductor group 44.

Single-phasing of a three phase induction motor is not a deliberate control action in conventional drive motor systems but occurs accidentally when power flow through one phase of the drive motor is interrupted. In order to avoid possible overloading and consequent over-heating in the stator winding due to unbalanced stator currents, some conventional drive motor systems include protective means to take the motor off the line when this condition occurs. However, in drive motor systems for a fan type load as illustrated in the preferred embodiment of the present invention, the horsepower load decreases in proportion to the cube of the drive motor speed, and the stator winding currents do not exceed the rated current level in low speed operation, so that the three phase motor 20 may be safely operated in the single phase mode.

For conventional induction motors the maximum torque which can be obtained under single phase operation is between one half and two thirds of the breakdown torque available in three phase operation, which is generally not less than twice full load torque. Therefore, the maximum torque of an induction motor in a single phase condition can be expected to be somewhat larger than full load torque. Hence, if the induction motor 20 is single-phased at the same frequency while it is running, it will continue to carry a normal load, but with unbalanced current flowing through its stator winding. If the three phase source 40 is completely disconnected from the motor and in its place a source of single phase alternating current of a lower frequency is connected across a single input phase of the winding 22, the motor 20 will operate as an induction generator and will feed power into the single phase source 10 until the motor slows down to a lower synchronous speed. Application of single phase alternating current from the frequency converter 10 is preferably delayed until after the motor 20 has coasted to the desired operating speed to avoid regeneration and the associated high current which would require a converter of higher rating.

The function of the frequency converter 10 is to provide a single phase alternating current output at a predetermined frequency which is lower than the frequency of the power source 40. In the preferred circuit configuration, the frequency converter 10 is a cycloconverter as illustrated in FIGS. 2 and 3 of the drawing. The cycloconverter 10 is a constant frequency AC-to-variable frequency AC frequency converter which characteristically comprises two major elements, a positive current conducting bank 12 and a negative current conducting bank 14, connected in parallel between a supply, such as the AC source 40, and the output circuit which is connected to the load 30. As is well known, each bank may consist of a number of switching rectifier devices, such as silicon controlled rectifiers or thyristors, which are interconnected in a bridge configuration so that output current from each bank can flow in only one direction. In order to supply alternating output current, the positive and negative bands 12, 14 are connected in reverse parallel relation with respect to the cycloconverter output circuit so that each bank may alternately provide a half cycle of each full cycle of output current.

During starting, acceleration from a lower speed to a higher speed, and full speed operation, the cycloconverter 10 is gated off by means of a gate control unit 60, and the motor 20 is connected through the contactor 50 to the three phase conductor group 42 which comprises 60 Hz supply lines 42A, 42B, and 42C. Thus, the inrush starting current is conducted through the phase conductor group 42 and the contactor 50 and not by the cycloconverter 10. If the desired operating speed is lower than the maximum rated speed, the contactor 50 is opened immediately after the motor exceeds the desired speed. The motor 20 is then allowed to coast to the desired speed and only then is the cycloconverter 10 gated on. Reducing the speed from a higher to a lower level is also achieved by coasting, with the gate signals of the cycloconverter 10 suppressed until the desired speed is reached.

Operation of the gate control unit 60 and the contactor 50 is coordinated by means of a velocity signal 62 which is proportional to the speed of the motor 20. The velocity signal 62 is applied to the gate control unit 60 and to a contactor control unit 80. The signal 62 may be developed by a speed sensing device 64, such as a tachometer generator, which is coupled to the drive motor 20 by means of a shaft 66.

A master control unit 70 provides a reference signal 72 to the contactor control unit 80 and a reference signal 74 to the gate control 60 for selection of mode and speed level. The gate control 60 includes means for suppressing the single phase output of the converter when the contactor 50 is in closed circuit condition, and also includes means for rendering the cycloconverter operable when the contactor 50 is in open circuit condition and the speed of the motor 20 is in proper correspondence with the preselected lower output frequency of the cycloconverter 10 to sustain stable operation at a desired lower operating speed. Specific circuits for performing these functions are well known and may be determined by reference to standard texts such as *Thyristor Phase and Controlled Converters and Cycloconverters*, by B. R. Pelly of Westinghouse Electric Corporation, and published by Wiley-Interscience.

Figure 4:
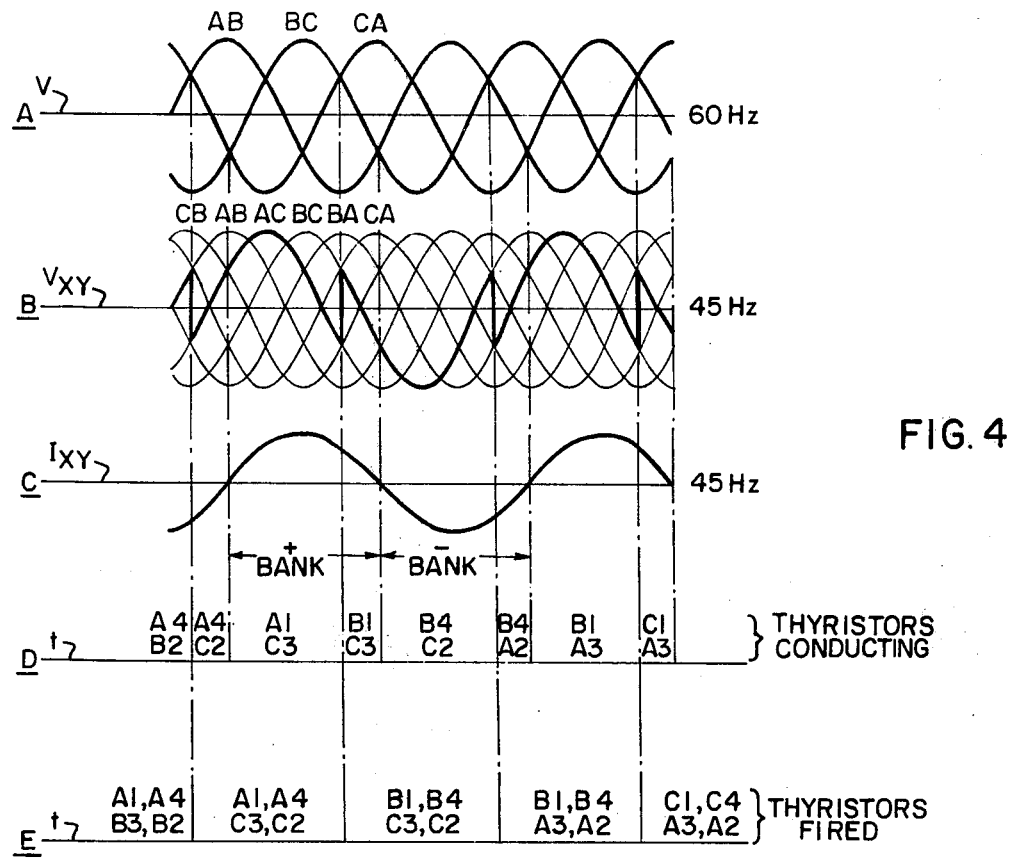
FIG. 4 is a set of curves which illustrates the operation of the cycloconverter of FIG. 3.

A suitable cycloconverter circuit is shown in the schematic diagram of FIG. 3. In FIG. 3 the cycloconverter 10 comprises the positive bank 12 and the negative bank 14 which are interconnected in reverse parallel relationship, each bank having a group of six controlled rectifiers A1, B1, C1, etc., which are arranged to form the well known six-pulse bridge converter circuit. Operation of the cycloconverter circuit 10 may be understood with reference to the waveforms of FIG. 4. The circuit formed by the two banks 12, 14 has a nominal positive terminal which is connected to the first single phase conductor 46, and has a nominal negative terminal which is connected to the other single phase conductor 47. Selected combinations of thyristors in each bank are gated on in a predetermined sequence or pattern to provide single phase alternating voltage and current waveforms $V_{xy}$ and $I_{xy}$ at the terminals for driving the motor 20. For example, in one cycle in which $V_{xy}$ characteristically includes a desired fundamental of 45 Hz, the thyristors A1, C3 of the bank 12 and the thyristors A4, C2 of the bank 14 are gated on for the duration as indicated in FIG. 4E, followed by gating of the thyristors B1, C3 and B4, C2 to complete the negative half cycle of $V_{xy}$. During this period, to permit alternate half cycles of $I_{xy}$ flow, the tyristors actually in conduction are A4-C2, A1-C3, B1-C3, and B4-C2 as indicated in FIGS. 4D and 4E. Within a given bank each thyristor is commutated naturally as conduction of the succeeding thyristor is initiated. Switching from thyristors of one bank to those of the other bank takes place at the natural zero crossings of the alternating current $I_{xy}$.

Because of the inductive nature of the motor winding 22, the current $I_{xy}$ is lagging behind the fundamental (45 HZ) component of the voltage $V_{xy}$, and is illustrated accordingly in FIG. 4C. Also, because of the inductive nature of the winding, it is assumed that the harmonic components of the voltage $V_{xy}$ result in negligible distortion of current $I_{xy}$ which therefore has a substantially sinusoidal wave shape.

The thyristor pairs are gated on sequentially at selected interphase coincident points to provide a predetermined output frequency as illustrated in FIGS. 4A and 4B. Suitable means to accomplish the selected gating are incorporated within the gate control unit 60 and may include a cross-over detector, pulse divider, and a pulse distributor electrically connected in series to provide a prescribed firing pattern. Specific circuits for performing these functions are well known and may be determined by reference to standard texts such as *Pulse, Digital, and Switching Waveforms* by J. Millman and H. Taub, which is published by the McGraw-Hill Book Company.

A static frequency converter such as the cycloconverter 10 which delivers variable frequency power to an induction motor such as the motor 20 must also vary the terminal voltage as function of frequency in order to maintain the proper magnetic conditions in the core of the motor. In practice, magnetic devices such as induction motors usually operate near saturation in order to give maximum utilization of the core material. When the operating frequency is reduced, the applied voltage must be reduced proportinally or the saturation flux density will be exceeded, resulting in excessive iron losses and magnetizing current. When the operating frequency is reduced, the applied voltage should by reduced proportionately in order to maintain the rated magnetic flux density. This can be accomplished by modifying the output voltage waveform to provide a signal having an equal half-cycle voltage-time integral. The total flux is generally proportional to the half-cycle voltage-time integral of the voltage waveform which is impressed across the winding. It is obvious by inspection that the half-cycle voltage time integral of the voltage waveforms of FIG. 4A and FIG. 4B are equal so that the air gap flux in the motor 20 will be maintained substantially at the rated level of the 60 Hz waveforms even though the frequency is lowered to 45 Hz in the single phase mode. The rated air gap flux for the motor 20 may be maintained at the nominal level at reduced speed levels such as 36 Hz and 30 Hz output without reducing voltage amplitude if proper firing patterns are utilized.

When the net half-cycle voltage-time integral of the single phase output waveform is preserved at a nominal level for reduced frequencies such as 36 Hz and 30 Hz, the harmonic content of the output waveform is increased and may be objectionable. For reduced harmonic output at substantially lower operating frequencies it may be desirable to utilize the cycloconverter circuit of FIG. 5. With this arrangement, the thyristors of the cycloconverter 10 may be fired in a pattern which will yield reduced harmonic content for the lower output frequencies as illustrated in FIGS. 6B, C, and D. Autotransformers 90, 92, and 94 are utilized to reduce the input voltage to the cycloconveter 10 thereby reducing the output voltage so that the net half-cycle voltage-time integral in each case remain substantaill equal to the nominal half-cycle voltage-time integral provided by the 60 Hz waveforms AB, BC, and CA.

Figure 5:
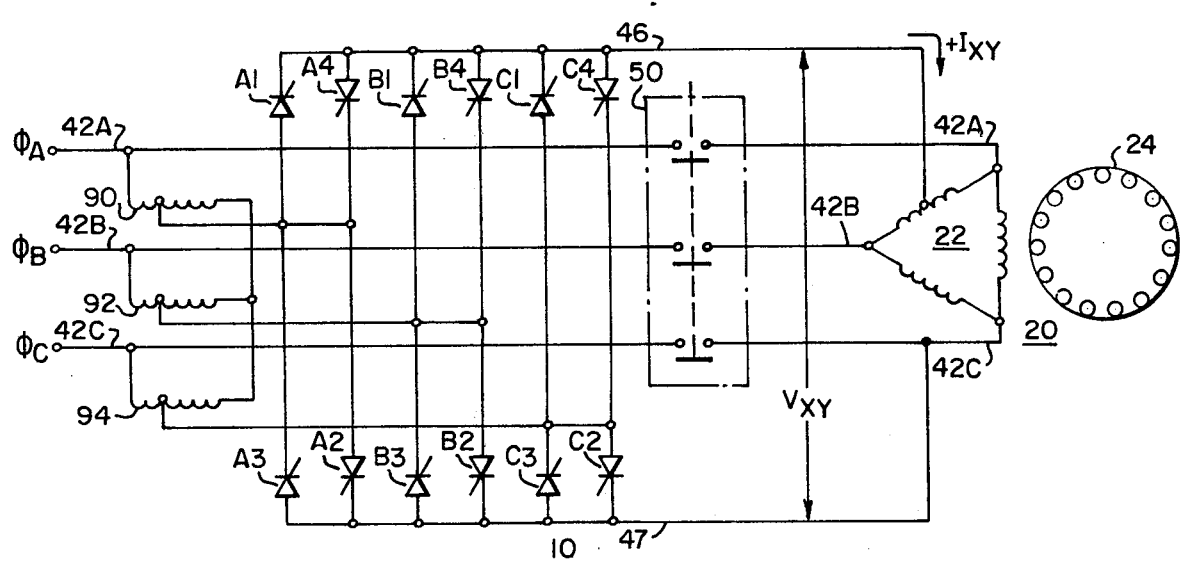
FIG. 5 is a schematic diagram of an alternative arrangement of the circuit of FIG. 3 in which autotransformers are utilized.
Figure 6:
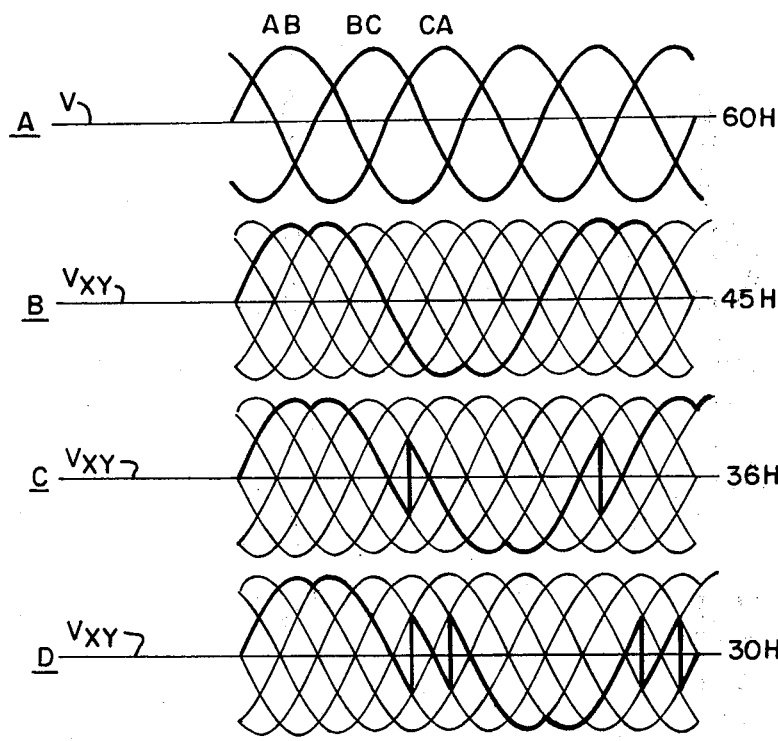
FIG. 6 is a set of curves which illustrates the operation of the cycloconverter system of FIG. 5.

An optional arrangement which provides uniform current distribution through the winding 22 of the motor 20 is shown in FIG. 5. In this arrangement, one phase of the stator winding 22 is center tapped and is connected by means of the phase conductor 46 to the nominally positive terminal of the cycloconverter 10. The remaining phase conductor 47 is connected in the usual way to the common point of the remaining winding phases. The current $I_{xy}$ is divided equally through the winding halves thereby avoiding overheating due to unequal current distribution.

It will be apparent that an improved variable speed drive has been provided for a polyphase induction motor. Because the motor is fed directly from three phase supply lines for starting and for full speed operation without using the cycloconverter, the thyristors of the cycloconverter may have relatively low power ratings. When used with a fan type load, the cycloconverter of the present invention may be rated to provide reduced power which decreases with the cube of motor speed, and its cost will be correspondingly lower. A simple single phase configuration instead of a three phase output circuit for the cycloconverter is utilized for further savings. The cycloconverter is rated to handle steady power but need not be rated to handle overload and inrush current associated with acceleration and breaking since its gating signals are suppressed during transition periods. In the interest of economy the drive circuit is operated at fixed speeds which requires certain discrete output frequencies from the cycloconverter. These frequencies are selected so that the complexity of control circuitry can be minimized; fixed firing patterns are used and no reference generator is required. Commutation of the thyristor switching elements is obtained by natural means which further reduces the complexity of the circuit.

It should be noted that whereas operation limited to discrete speeds is economically favorable, continuous speed control is also possible from about 45 Hz down. In this mode of operation the output voltage is continuously controllable by a reference generator of sinusoidal, trapesoidal, or rectangular voltage and the voltage waveform and amplitude continuously vary with frequency.

While a particular embodiment of the invention has been shown and described for the purpose of illustration, other arrangements and embodiments may be practiced by those skilled in the art without departing from the scope and spirit of the invention. It is not desired, therefore, that the invention be limited to the specific arrangements described herein.

We claim:

1. A system for controlling the flow of power from a polyphase alternating current source to an induction motor having a polyphase input winding, said system comprising:

a switch for opening and closing an electrical circuit between corresponding phases of said power source and said motor;

a frequency converter for changing constant frequency polyphase alternating current to single phase alternating current of a preselected lower frequency, said converter having a polyphase input circuit for receiving polyphase power from said source and having a single phase output circuit for delivering single phase power to a single input phase of said motor; and control means for disabling said converter when said switch is in circuit closed condition and rendering said converter operable when said switch is in circuit open condition, said motor receiving power from said polyphase source through said switch for operation in a polyphase mode at a speed determined by the frequency of said polyphase source when said switch is in circuit closed condition, said motor receiving power from said power source through said frequency converter for operation in a single phase mode at a speed determined by said preselected output frequency of said converter when said switch is in circuit open condition.

2. The motor control system defined in claim 1 including means for sensing the speed of said motor, the output of said speed sensing means being coupled with said control means to render to said converter operable only when said switch is in circuit open condition and the speed of said motor is in proper correspondence with the preselected output frequency of said converter to sustain stable motor operation at a desired lower speed.

3. The motor control system defined in claim 1 in which said polyphase motor input winding is a three phase delta connected winding having a center tapped input phase, the single phase output of said frequency converter being electrically connected to said center tap and to the common connecting point of the remaining two phases, thereby providing a uniform current distribution in the two winding halves when said motor is operating in a single phase mode.

4. The motor control system defined in claim 1 including an autotransformer electrically connected in series with each phase of said polyphase input circuit of said frequency converter to reduce the magnitude of the applied polyphase voltgae, said frequency converter providing a single phase alternating output waveform that characteristically includes a desired fundamental frequency component and which has a net half-cycle voltage-time integral which is substantially equal to the half-cycle voltage-time integral of a single phase of said source.

5. The motor control system defined in claim 1, wherein said frequency converter comprises a cycloconverter having positive and negative current conducting banks of gate controlled switching rectifier elements which are selectively gated by said control means to convert three phase alternating current from said power source into single phase alternating current of a preselected lower frequency, said positive and negative blanks being connected in parallel with each other and back-to-back with respect to said single phase output circuit, each bank alternately providing a half cycle of each full cycle of output current.

6. The motor control system defined in claim 5, wherein each of said conducting banks comprises a plurality of pairs of said switching rectifier elements, a positively poled rectifier pair and a negatively poled rectifier pair being connected to each phase of said polyphase input circuit, each rectifier elements being connected between its associated phase and one side of said single phase output circuit to conduct current, when gated on, from said power source to said single input phase of said motor winding, with positive phase-to-phase current being conducted through a preselected combination of said positively poled phase associated rectifier elements, and negative phase-to-phase current being conducted through a preselected combination of negatively poled phase associated rectifier elements, whereby single phase alternating current is conducted through said single input phase of said motor winding.

7. The motor control system defined in claim 5, in which said polyphase source provides substantially identical alternating waveforms for each phase, the combination including means for deriving a periodic signal which corresponds to the coincidence of interphase waveforms and means for controlling the gating of said switching rectifier elements in each of said banks in response to said periodic signal, preselected ones of said rectifier elements from each of the respective phase associated rectifier pairs in each bank being gated on simultaneously, the preselected combinations of rectifiers being gated on sequentially at certain interphase waveform coincident points, whereby predetermined portions of said polyphase alternating waveforms are conducted sequentially through said single phase output circuit to provide a single phase alternating waveform that characteristically includes a desired fundamental frequency component.

8. The combination of claim 7 in which the net half-cycle voltage-time integral of said single phase alternating waveform is substantially equal to the half-cycle voltage-time integral of a single phase of said polyphase source.

9. In a drive motor system wherein a polyphase induction motor is mechanically coupled to a fan type load to drive said load at a predetermined speed for an extended period, said motor receiving polyphase power through a contactor from a constant frequency source, the combination with said motor of a cycloconverter for driving said motor at reduced speeds, said cycloconverter providing a single phase alternating current output of a preselected lower frequency to a single input phase of said motor, including control means for closing said contactor and gating said cycloconverter off so that said motor is driven solely by polyphase power from said constant frequency source during starting, acceleration from a lower speed to a higher speed, and full speed operation; said control means opening said contactor when reduced speed operation is desired, said motor coasting from a higher speed to a lower desired speed with gate signals of said cycloconverter suppressed until the desired speed in reached, said cycloconverter being gated on when the coasting speed of said motor is in proper correspondence with the output frequency of said cycloconverter to sustain stable motor operation at a desired lower speed.

* * * * *